UNITED STATES PATENT OFFICE.

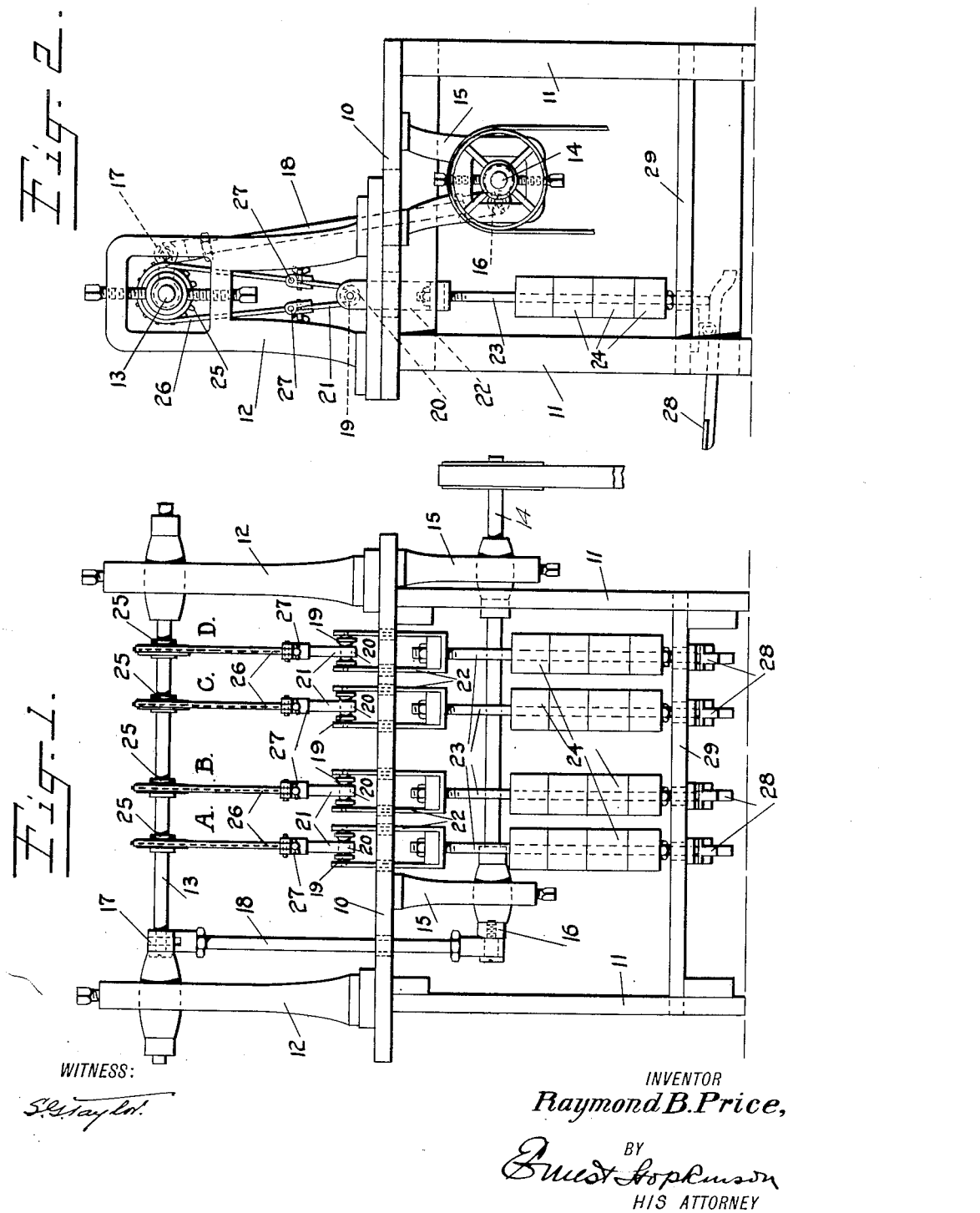

RAYMOND B. PRICE, OF NEW YORK, N. Y., ASSIGNOR TO RUBBER REGENERATING COMPANY, A CORPORATION OF INDIANA.

TESTING-MACHINE.

1,347,291. Specification of Letters Patent. Patented July 20, 1920.

Application filed March 24, 1916. Serial No. 86,326.

*To all whom it may concern:*

Be it known that I, RAYMOND B. PRICE, a citizen of the United States, residing at New York, county and State of New York, have invented certain new and useful Improvements in Testing-Machines, of which the following is a full, clear, and exact description.

This invention relates to machines for testing the strength of adhesion between plies of vulcanized rubber and fibrous material.

Plied-up material, such for instance, as plies of fabric united by a bond of vulcanized rubber, is used extensively in the manufacture of tires, belts, etc., and in such articles it is subjected to continual flexing or change in shape. This continual change in shape of the plies causes disintegration of the rubber bond which eventually gives way and permits separation of the plies. The strength of adhesion of the vulcanized rubber to the fabric determines to a great extent the amount of flexing which the material will withstand before separation of the plies takes place.

The present invention has for an object to determine the strength of adhesion between plies of fabric united by a bond of vulcanized rubber, and for this purpose provides means for continually flexing a sample of the material to be tested until separation of the plies occurs.

With the above and other objects in view, the invention consists in certain novel details of construction and combinations of parts hereinafter fully described and claimed, it being understood that various modifications may be resorted to within the scope of the appended claims.

The invention can be readily understood from the following description, taken in connection with the accompanying drawing, in which—

Figure 1 is a front elevation of a machine constructed in accordance with the invention.

Fig. 2 is a cross-sectional view of the machine.

Referring now to the drawing in which like characters of reference designate similar parts, the machine is shown to comprise a table 10 which is supported upon legs 11 and upon which are mounted pedestals 12 that support a rock shaft 13. A drive shaft 14 is secured to the table by shaft hangers 15 and is equipped at one end with a crank 16 which is connected with an arm 17 on the rock shaft by a connecting rod 18.

A plurality of testing devices A, B, C, and D, are supported by and operated from the rock shaft 13 and since each device in the present embodiment is a duplicate of the rest, a description of the device D will suffice for all.

The testing device D comprises an idler 19 around which a loop 20 in the strip 21 of the material to be tested is passed. The idler is mounted in a frame 22 from which there depends a rod 23 which carries a plurality of weights 24. The rock shaft 13 is equipped with a sprocket wheel 25 over which is trained a sprocket chain 26, the ends of the sprocket chain being equipped with clamps 27 that are arranged to grasp the strip 21 upon opposite sides of the loop thereof. The weights 24 consequently are suspended from the rock shaft 13 by means of the sprocket wheel, sprocket chain, strip of material, and idler, with resultant tensioning of the strip. It will be seen that the angle by which the material is bent upon itself may be changed by relatively varying the sizes of the sprockets 25 and idlers 19.

For applying and removing the strip of material, a pedal 28 is pivoted on a guide 29, through which the lower end of the rod 23 slidably projects. The pedal abuts the end of the rod and when the operator depresses the pedal, the weights 24 are raised and the strip is relieved of tension so that its removal and replacement by another strip may be performed.

In operation, the rock shaft is rocked and operates to reciprocate the clamps 27 whereby the loop 20 is moved alternately in opposite directions longitudinally of the strip 21. This progressive movement of the loop 20 longitudinally of the strip operates to continually flex the strip throughout a considerable area intermediate its ends. The operation of the machine is continued until separation between the plies of fabric occurs.

Although I have described one specific embodiment of the invention, I do not limit myself to the specific apparatus described, since a wide range of modifications may be employed within the scope of the appended claims, in practising the invention.

Having thus described my invention, what I claim as new and desire to protect by Letters Patent is:

1. A flexing machine comprising an idler for forming a loop in the material to be flexed, a tension device operatively connected with the idler for tensioning the material, means for grasping the material on opposite sides of the loop thereof, and automatic continuously operating means for moving the first named means to cause the loop to move longitudinally of the tensioned material.

2. A flexing machine comprising a support, a member around which a loop of the material to be flexed may be passed, means for grasping the material on opposite sides of the loop thereof, automatic means for continuously reciprocating the first named means, and a weight operatively connected with said member and suspended from said support by the material and both of said means.

3. A flexing machine comprising a rock shaft, a member around which a loop of the material to be flexed may be passed, a sprocket wheel on said rock shaft, a sprocket chain on said sprocket wheel adapted to be operatively connected at the ends with opposite sides of the loop of said material, a tension device operatively connected with said member for exerting a tension on the material, and means for rocking said rock shaft to cause the loop of the tensioned material to move longitudinally thereof.

4. A flexing machine comprising means to hold material to be flexed at opposite ends thereof, a weighted member adapted to exert tension on the material and change the path thereof, automatic means to continuously move the material bodily over said member whereby a portion thereof will be flexed, and manually operated means for relieving the tension when desired.

5. A flexing machine comprising means to hold material to be flexed in the form of an open depending loop, a weighted roller adapted to be supported by the loop, and automatic means to continuously move the material bodily back and forth over the roller.

6. A flexing machine comprising a rock shaft, a member around which a loop of the material to be flexed may be passed, a sprocket wheel on said rock shaft, a sprocket chain on said sprocket wheel, a pair of clamps connected to said sprocket chain and adapted to grip the ends of the loop of said material, a tension device operatively connected with said member for exerting a tension on the material, and means for rocking said rock shaft to cause the loop of the tensioned material to move longitudially thereof.

7. A flexing machine comprising a rock shaft, a pulley around which a loop of the material to be flexed may be passed, a sprocket wheel on said rock shaft, a sprocket chain on said sprocket wheel, a pair of clamps connected to said sprocket chain, said clamps being adapted to grip opposite sides of the loop of said material, a tension device operatively connected with said pulley for exerting a tension on the material, and means for rocking said rock shaft to cause the loop of the tensioned material to move longitudinally thereof.

8. A machine for testing material by flexure comprising a support for engaging the part of the material where flexed, a pair of supports for engaging the respective ends of the material, means tending to relatively separate said pair from said first support when operating upon material to produce a tension therein, and means for reciprocating the material across the said first support to continually change the point of flexure in first one direction and then in the opposite direction, said means including means coöperating with said first support for determining the angle of flexure.

9. A machine for testing material by flexure comprising a support for engaging the part of the material where flexed, a pair of supports for engaging the respective ends of the material, means tending to relatively separate said pair from said first support when operating upon the material to produce a tension therein, an initial drive whereby the material is reciprocatorily moved, and means intermediate the said drive and said first support and coöperating with said first support for determining the angle of flexure.

Signed at New York, N. Y., this 22d day of March, 1916.

RAYMOND B. PRICE.